United States Patent [19]
Fan

[11] Patent Number: 5,722,769
[45] Date of Patent: Mar. 3, 1998

[54] RETRACTABLE PROJECTOR

[75] Inventor: Eric Fan, Taipei Hsien, Taiwan

[73] Assignee: Primax Electronics Ltd., Taipei Hsien, Taiwan

[21] Appl. No.: 610,698

[22] Filed: Mar. 4, 1996

[51] Int. Cl.⁶ .............................. F21V 7/18; G03B 21/28
[52] U.S. Cl. .............. 362/282; 362/299; 353/98; 353/119
[58] Field of Search ................ 362/269, 299, 362/347, 282, 277; 353/64, 66, 98, 119, DIG. 3, DIG. 4

[56] References Cited

U.S. PATENT DOCUMENTS 2,767,611 10/1956 Gerald ........................ 353/119
2,863,356 12/1958 Goldberg ..................... 353/119
3,167,998 2/1965 Appeldorn et al. ............ 353/DIG. 3
5,416,541 5/1995 Fog ............................ 353/DIG. 3

Primary Examiner—Y. My Quach
Attorney, Agent, or Firm—Christie, Parker & Hale, LLP

[57] ABSTRACT

The present invention provides a retractable projector wherein a connector for securing together the reflector and the upper cover of the projector ensures both convenience and security of the projector. Such projector includes a casing housing therein a light source emitting a light for illuminating a projected object; a reflector mounted in said casing for reflecting said light to said object; an upper cover mounted on said casing for supporting thereon said projected object and for passing therethrough said light reflected from said reflector to said projected object; and connector for securing together said reflector and said upper cover.

14 Claims, 15 Drawing Sheets

1

RETRACTABLE PROJECTOR

FIELD OF INVENTION

This invention generally relates to a projector, and more particularly to a retractable projector.

BACKGROUND OF THE INVENTION

Generally, a projector is very bulky in size and many efforts have been made to reduce the size to make it easily portable. As shown in FIG. 1, the light from the light source 10 goes straight upward to a projected object in the prior design, but this makes the projector body 11 very bulky. So the light path is changed sideward and then the light is reflected upward by a reflector, which makes it possible to retract the device, except for the main body of the projector to minimize the size. Because the reflector is fragile and may be broken when a collision occurs when carrying the projector, the first consideration of the present invention is to ensure both convenience and security while providing an improvement over the prior design.

SUMMARY OF THE INVENTION

An object of the present invention is to provide a projector having a connector for securing together the reflector and the tipper cover of the projector.

In accordance with the present invention, a projector includes a casing housing therein a light source emitting therefrom a light for illuminating a projected object; a reflector mounted in the casing for reflecting the light to the projected object; an tipper cover mounted on the casing for supporting thereon the projected object and for passing therethrough the light reflected from the reflector to the projected object; and a connector for securing together the reflector and the cover.

The projector further includes a projecting device mounted above the casing and the upper cover, collecting the light from the cover, and imaging the light to be projected to a specific place.

In the projector, the upper cover is pivotally connected to the casing by the first pivot device.

In the projector, the reflector is pivotally connected to the upper cover with a second pivot device in order that the reflector can rotate with the second pivot device.

In the projector, the connector includes a first bar member having the first end pivotally connected to the upper cover and the opposite second end, and the second bar member having the third end pivotally connected to the reflector and a fourth end pivotally connected to the second end.

In the projector, the connector further includes a buffering device mounted between the second and the fourth ends to keep the reflector from violent collision when rotating as the upper cover is lifted.

The projector further includes a support mounted between the projecting device and the casing for supporting the projecting device on the casing.

In the present projector, the support is preferably foldable and can be retracted into the casing.

In the present projector the support and the projecting device can be fixed at the bottom of the casings so that the reflector is positioned above the projecting device when the projector is retracted.

In the present projector, the reflector can be a reflecting mirror.

The present invention may best be understood through the following descriptions with reference to the accompanying drawings.

DETAILED DESCRIPTION OF THE PREFERRED EMBODIMENT

The present invention will now be described more specifically with reference to the following embodiments.

Figure 1:
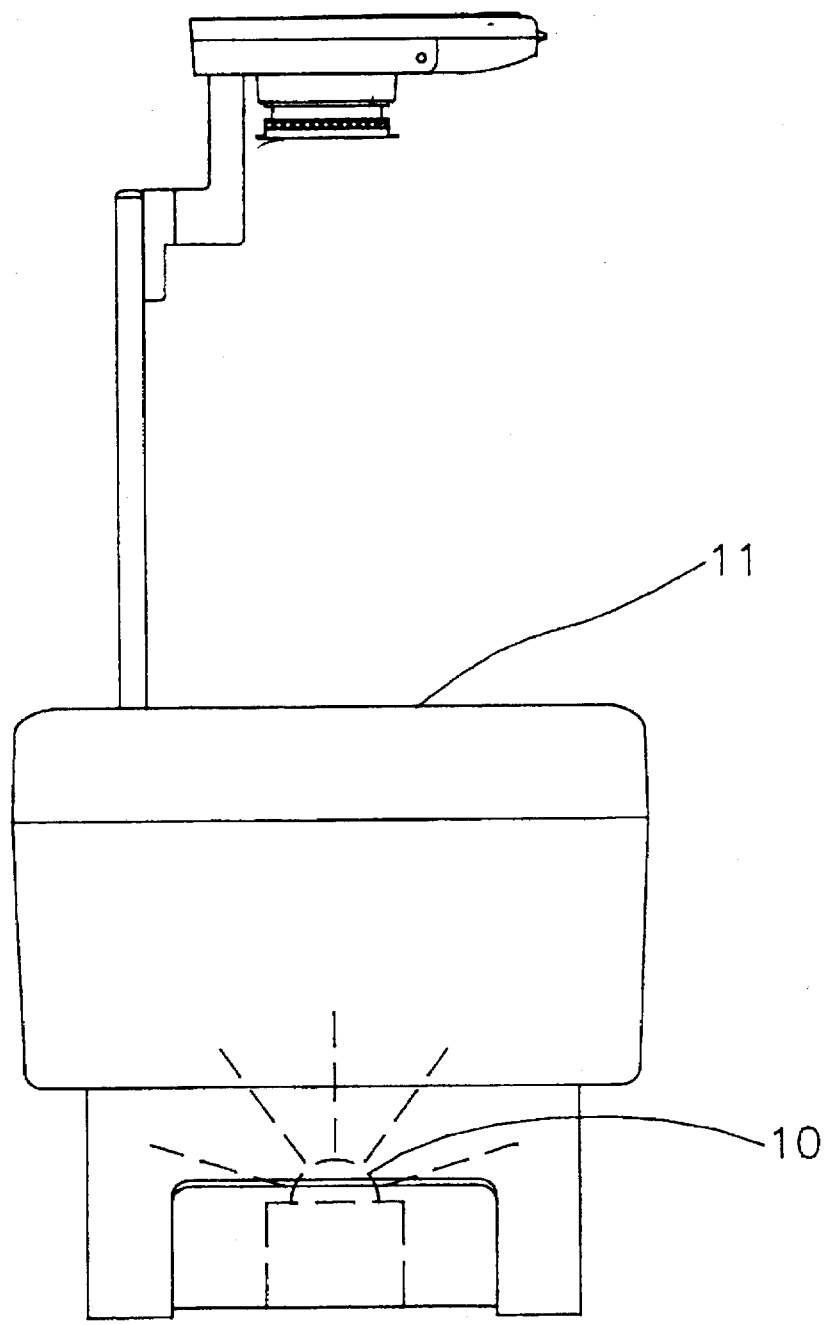
FIG. 1 is a sectional view of a prior art projector.
Figure 2:
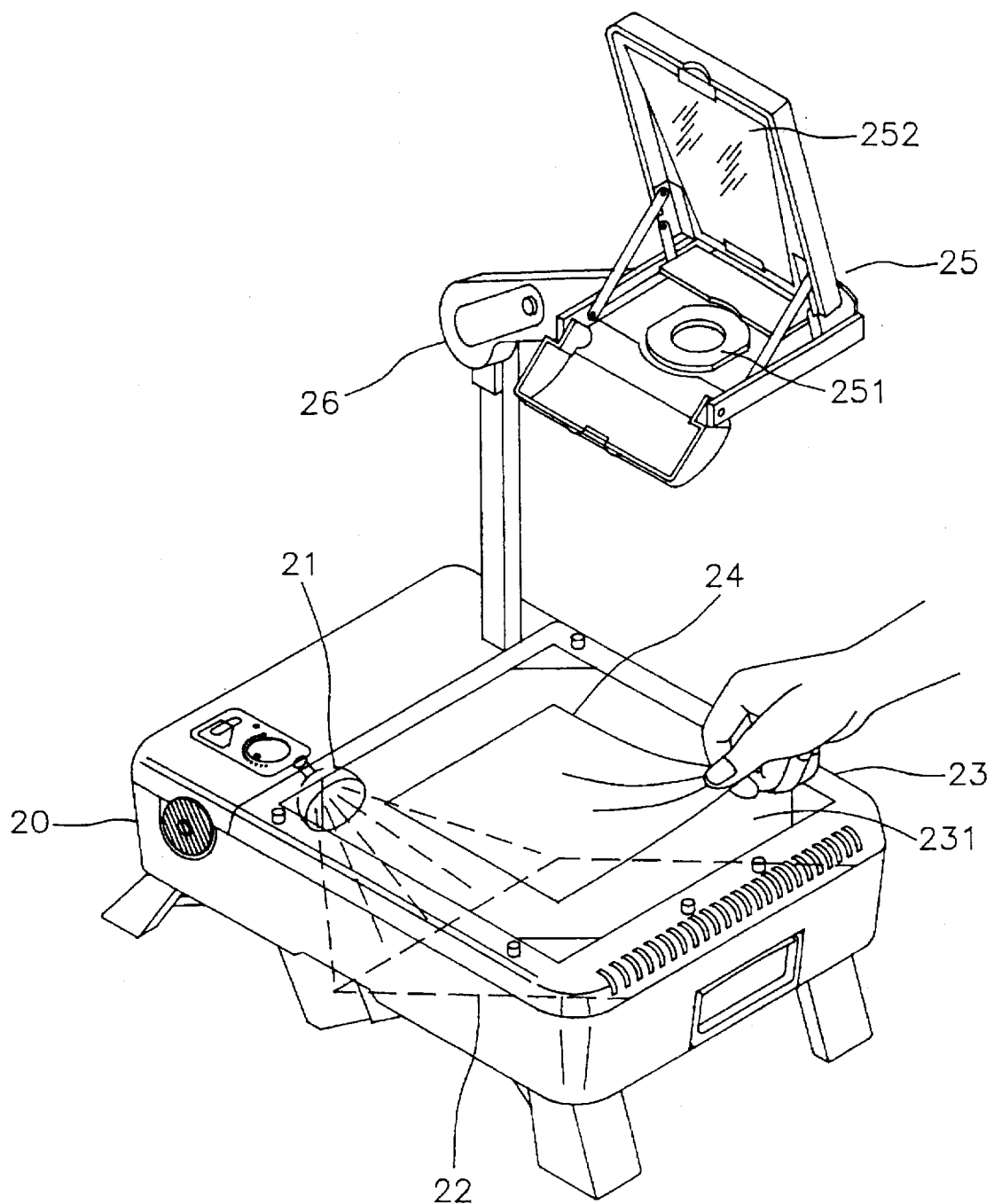
FIG. 2 is a schematic view of the preferred embodiment of a projector according to the present invention.

Referring to FIG. 2, a light source 21 is devised in the casing housing 20. The light from light source 21 goes to the upper cover 23 via the reflector 22. The reflector 22 can be the first reflecting mirror. The upper cover 23 includes a light collecting lens and a lens plane 231. When placing a projected object 24, e.g., a transparency 24, on the lens plane 231 of the upper cover 23, the light from the first reflecting mirror 22 goes through the lens plane 231 of the upper cover 23, the transparency 24 and then is collected at the projecting device 25 above the upper cover 23. The lens 251, one part of the projecting device, images the incoming light. The second reflecting mirror 252, another part of projecting device 25, projects the light from the lens 251 to a specific place. The projecting device 25 has a foldable support 26 above the upper cover 23. The foldable projecting device 25 and the support 26 can be retracted into the casing housing 20.

Figure 3A:
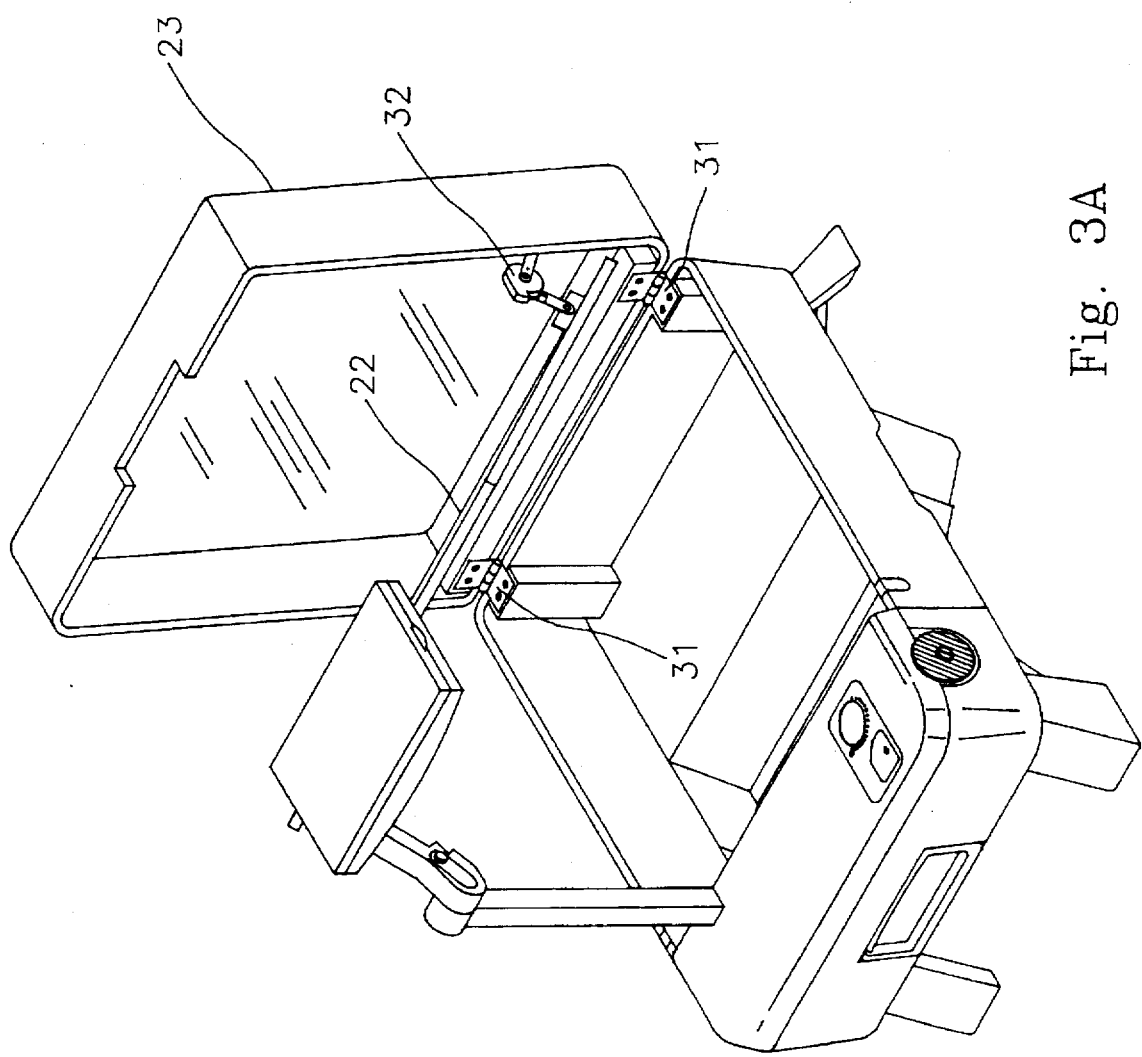
FIG. 3A is a perspective view of the projector according to the present invention upon opening the upper cover.
Figure 3B:
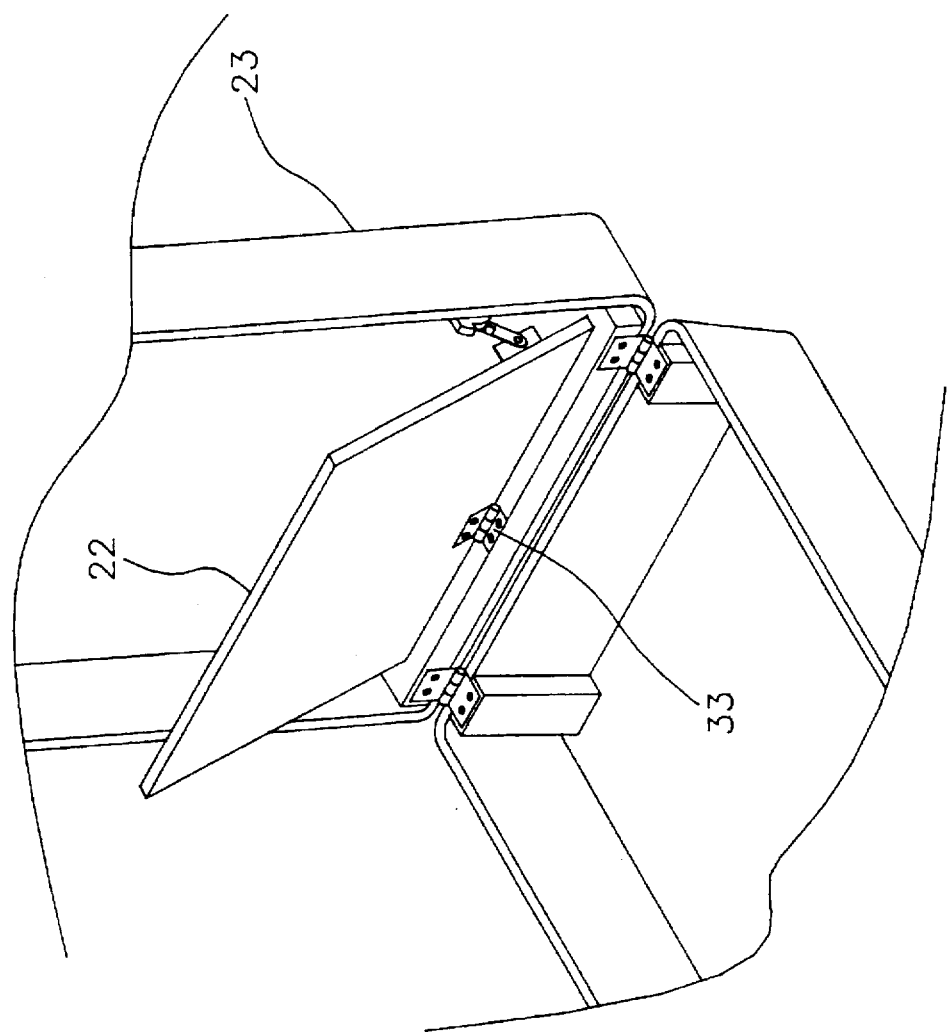
FIG. 3B is an enlarged view showing how a reflector of a projector according to the present invention is pivotally connected.
Figure 4:
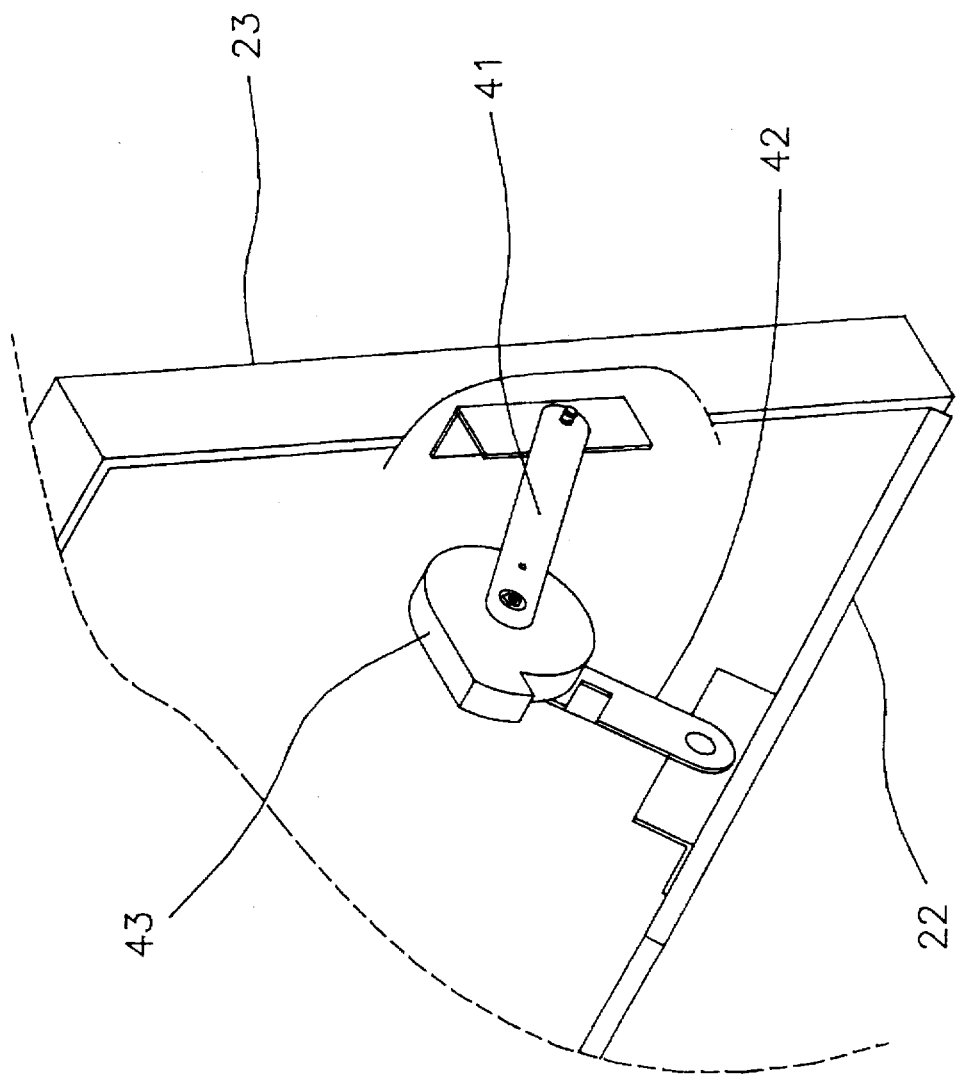
FIG. 4 is an enlarged view of the connector of the projector according to the present invention.

Referring now to FIGS. 3A–3B and FIG. 4, the upper cover 23 connects to the casing housing 20 with the first pivot device 31. The first reflecting mirror 22 connects to the upper cover 23 with the second pivot device 33. Furthermore, the upper cover 23 and the first reflecting mirror 22 connect together with a connector 32 so that when the upper cover 23 is lifted with the first pivot device 31 as the axis, the first reflecting mirror 22 can be lifted at the same time with the second pivot device 33 as the axis. The connector 32 includes two bar members, the first bar member 41 and the second bar member 42. The two ends of the first bar member 41 connect to the upper cover 23 and one end of the second bar member 42, respectively, and the other end of the second bar member connects to the first reflecting mirror 22. Every connecting point is not fixed so that the first and the second bar members 41 and 42 work as a linkage operation. At the connecting point of the first and the second bar members 41 mid 42, there is even a buffering device 43 to reduce the linking motion. Because of the fragility of the upper cover 23 and the first reflecting mirror 22 connected together by the connector 32, the buffering device 43 avoids damage caused by a collision. The connector 32 enables the reflecting mirror 22 to be lifted upon lifting the upper cover 23. When retracting the projecting device 25 and the foldable support 26 into the casing housing 20, they are positioned under the first reflecting mirror 22.

Figure 5A:
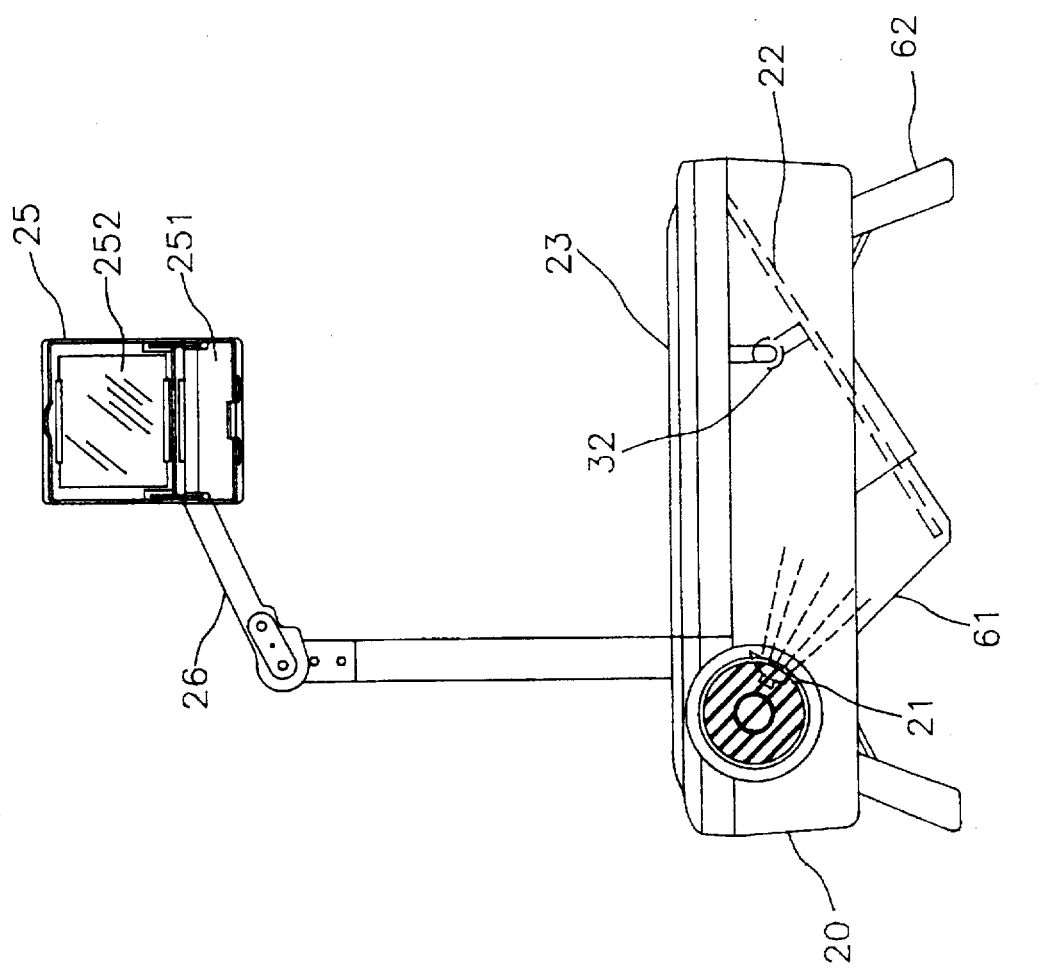
FIGS. 5A–5F are schematic views of the preferred embodiment of the projector according to the present invention which are retracted.
Figure 5B:
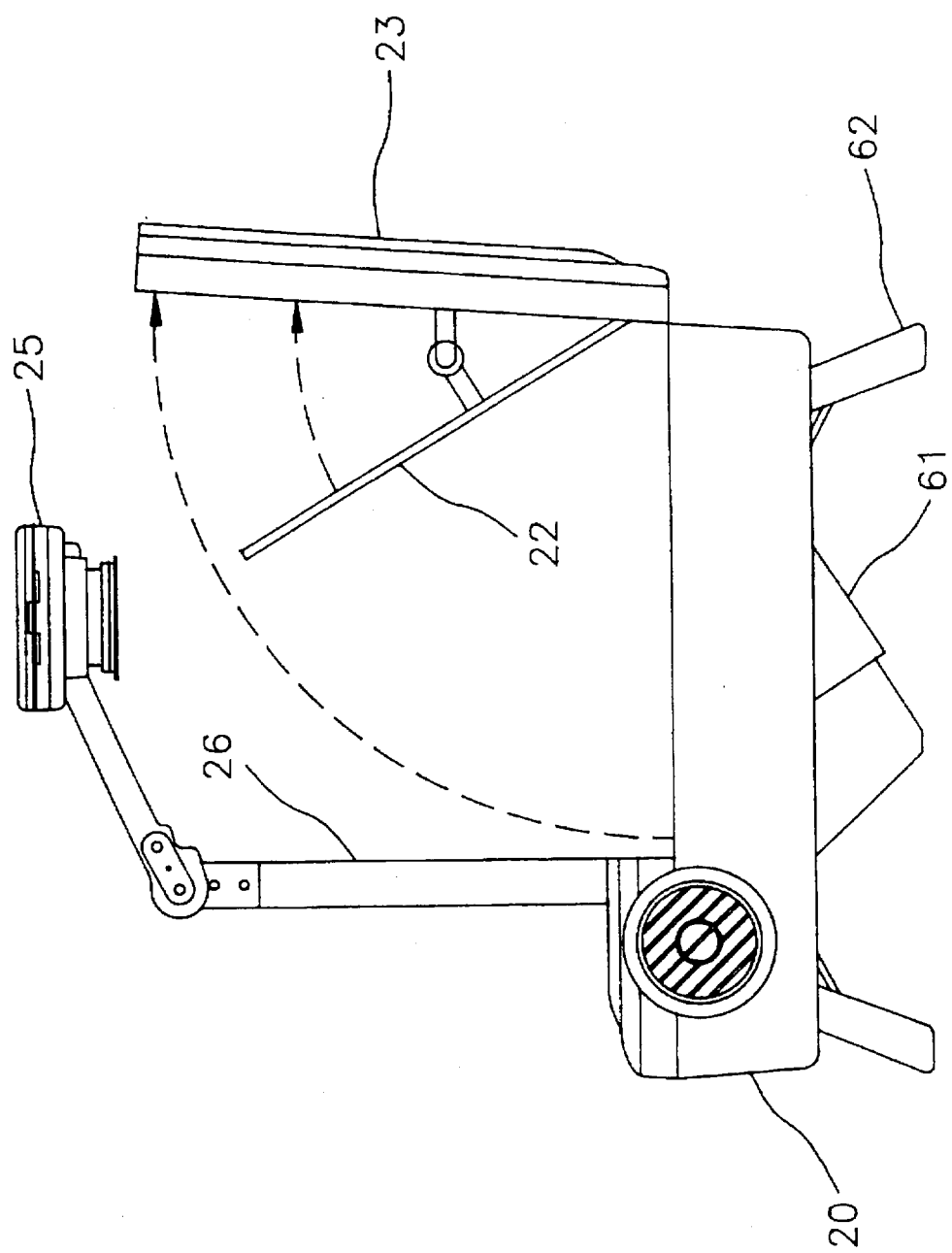
Figure 5C:
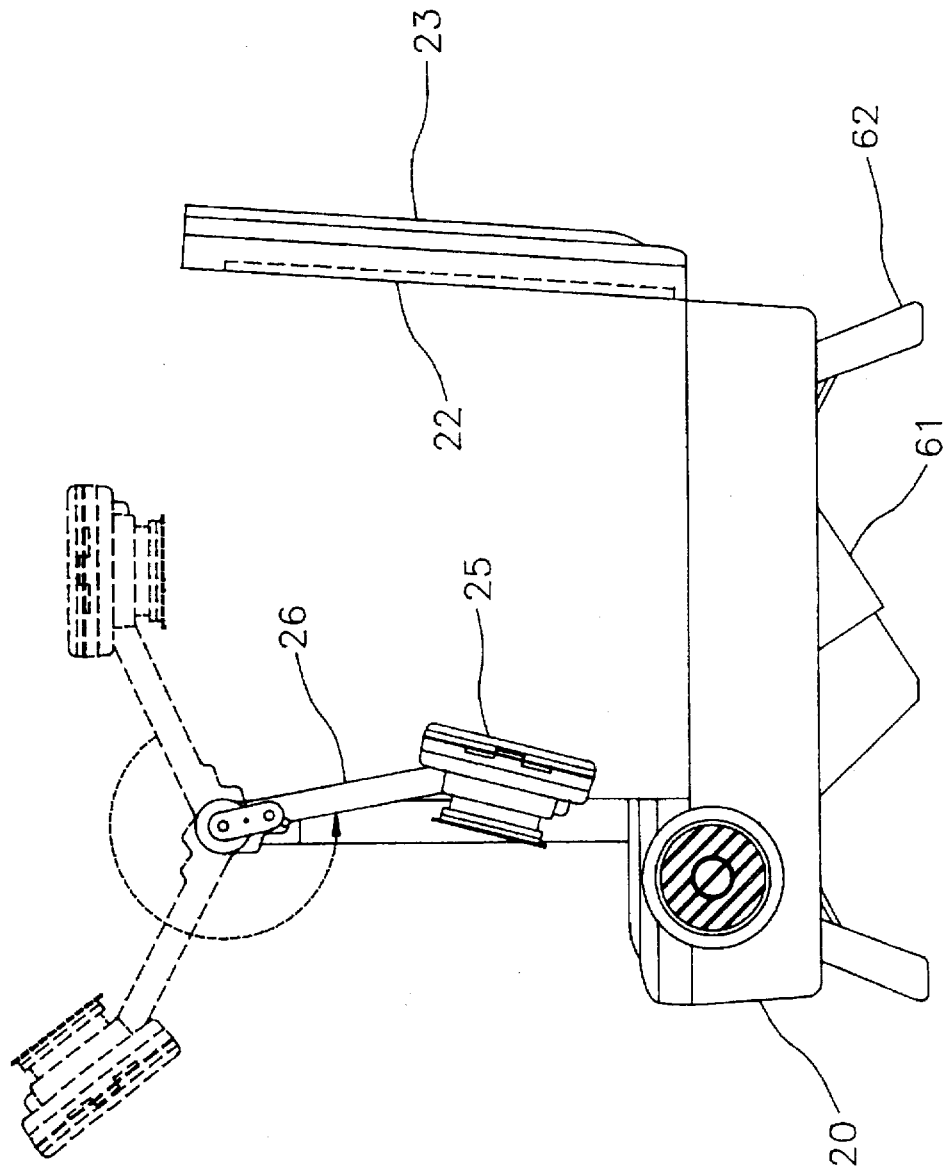
Figure 5D:
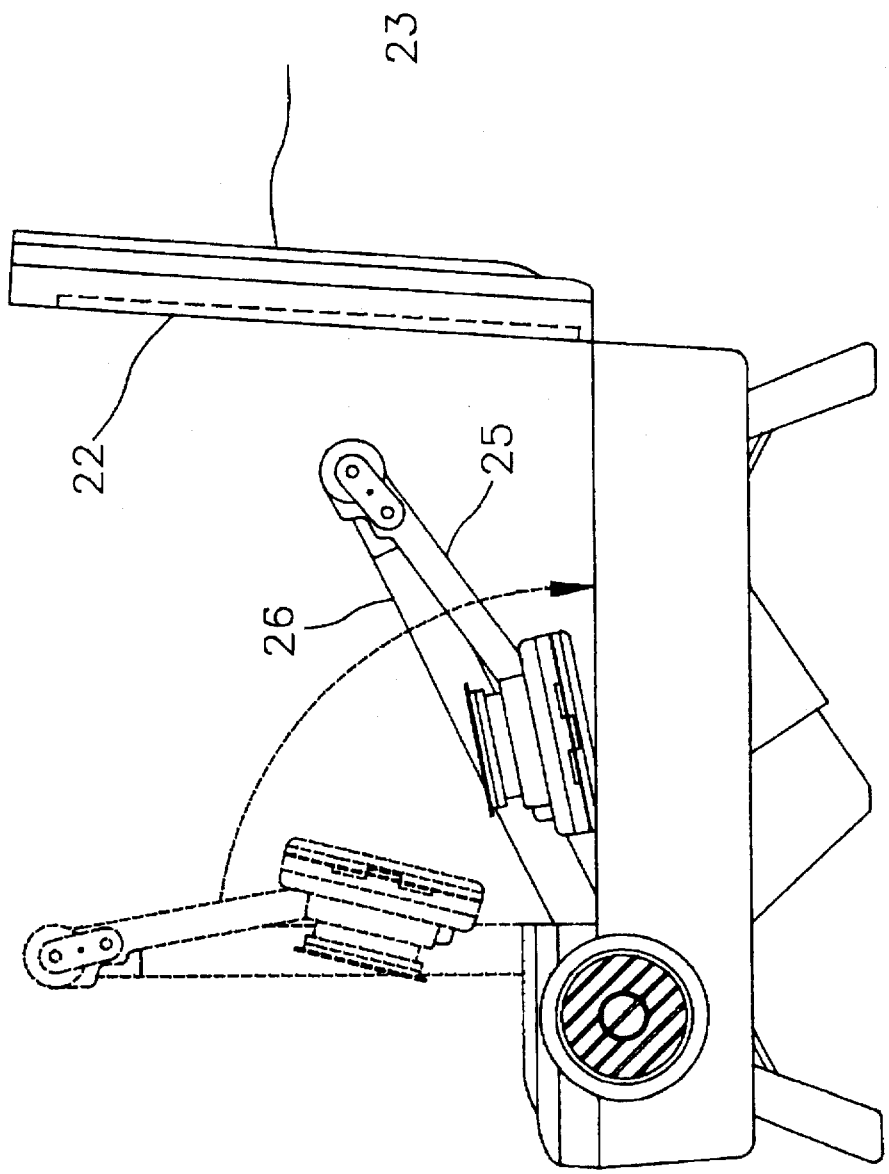
Figure 5E:
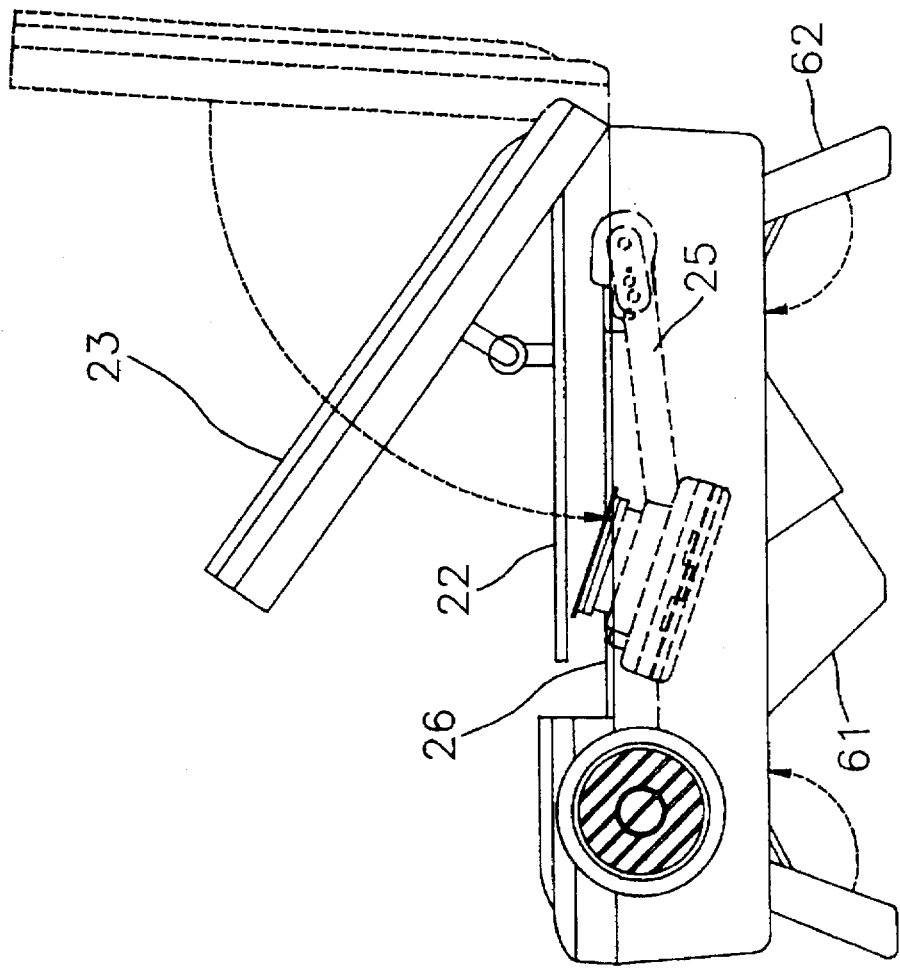
Figure 5F:
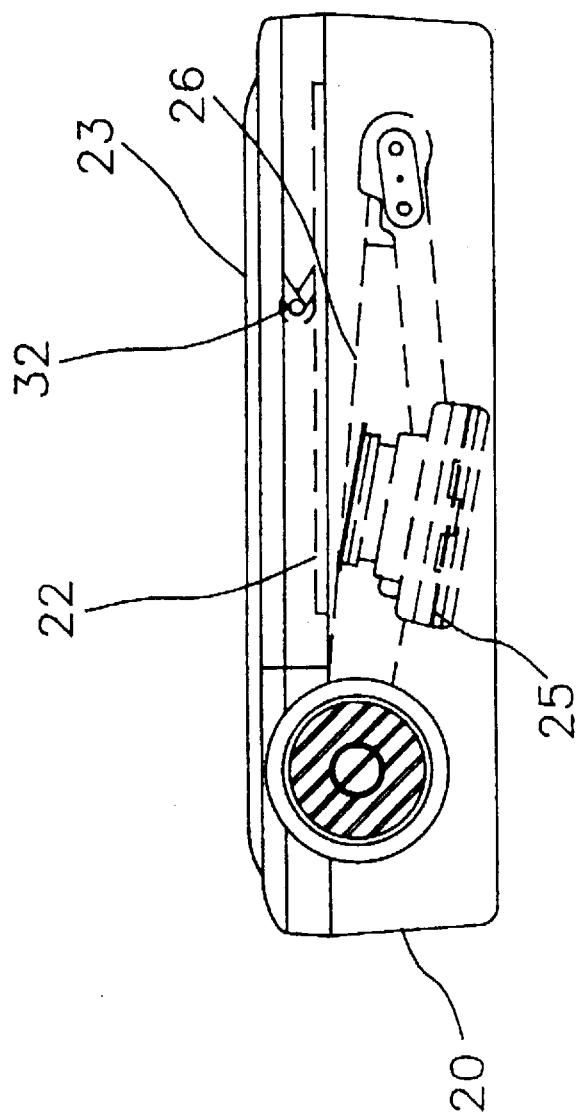

Referring now to FIGS. 5A–5F. In FIG. 5A, when using this projector, the first reflecting mirror 22 lies obliquely within the casing housing 20 so as to reflect the light from the light source 21 to the upper cover 23. In the present embodiment, under the casing housing 20 there is a holder 61 to hold the obliquely lying first reflecting mirror 22. Upon retracting the present embodiment, as shown in FIG. 5B, the reflecting mirror 22 is lifted with the upper cover 23. A method for storing the projector includes the following steps. First, close the lens 251 and the second reflecting mirror 252 together. Second, rotate the foldable support 26 and move the reflecting mirror 22 to the upper cover 23 as shown in FIG. 5C. Third, retract the foldable support 26 and the projecting device 25 and fix them at the bottom of the casing housing 20 as shown in FIG. 5D. Last, close the upper cover 20, close the supporting stands 62 and the holder 61 to the casing housing 20 as shown in FIG. 5E to make the present embodiment as a box like that shown in FIG. 5F. Notice that in FIG. 5F, the reflecting mirror 22 is kept in the horizontal position. The room under the reflecting mirror 22 can be used to put therein not only the projecting device 25 and the foldable support 26, but also other components such as the power conducting wire and the spare light source to minimize the size of the projector in the present embodiment. In this way, the room is perfectly used and because of the buffering device 43 of the connector 32, the delicate components such as the lens 251, the first reflecting mirror 22 or the light collecting lens and the lens plane 231 of the upper cover 23 won't be damaged if a collision occurs upon carrying the projector.

Figure 6A:
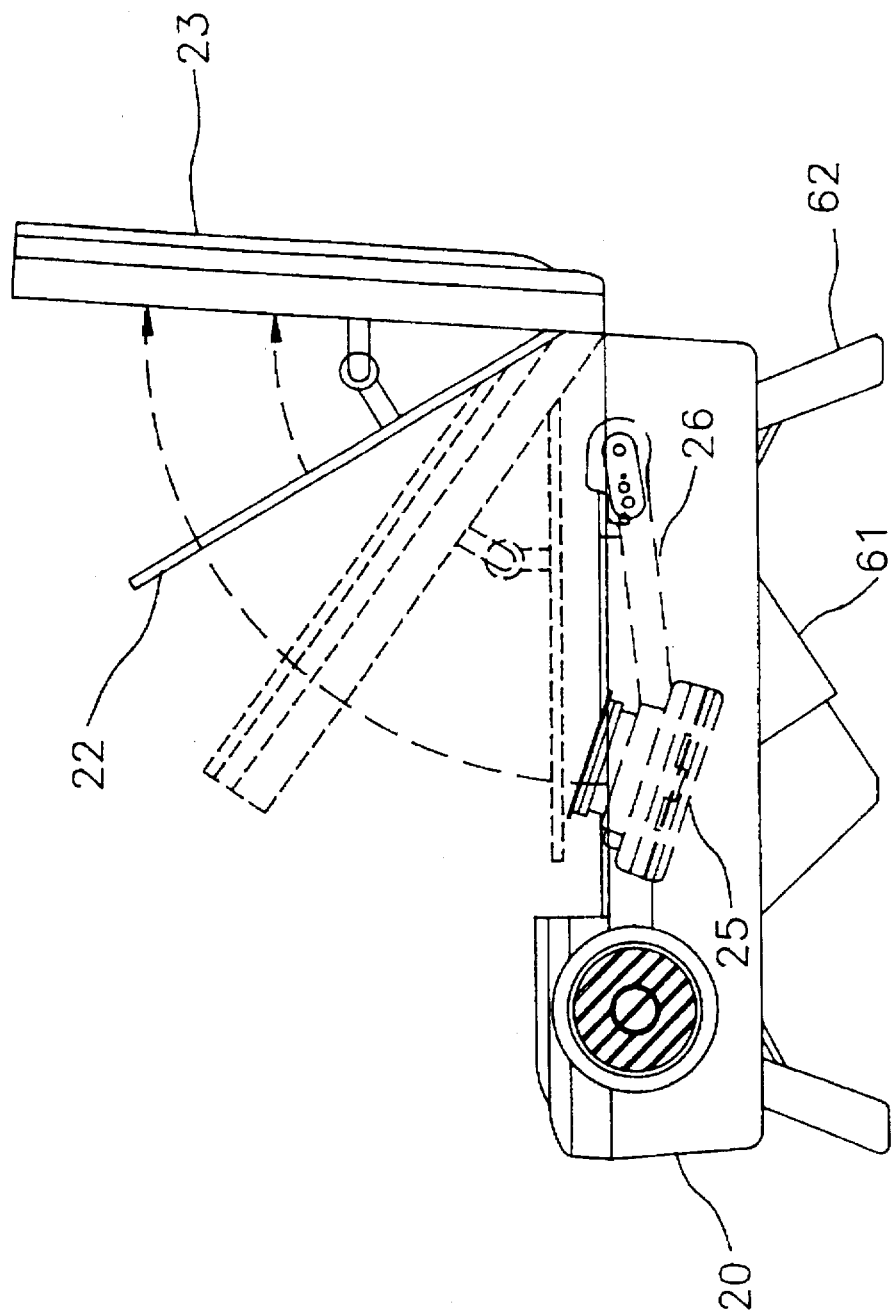
FIGS. 6A–6D are schematic views showing how a preferred embodiment of the projector according to the present invention is opened.
Figure 6B:
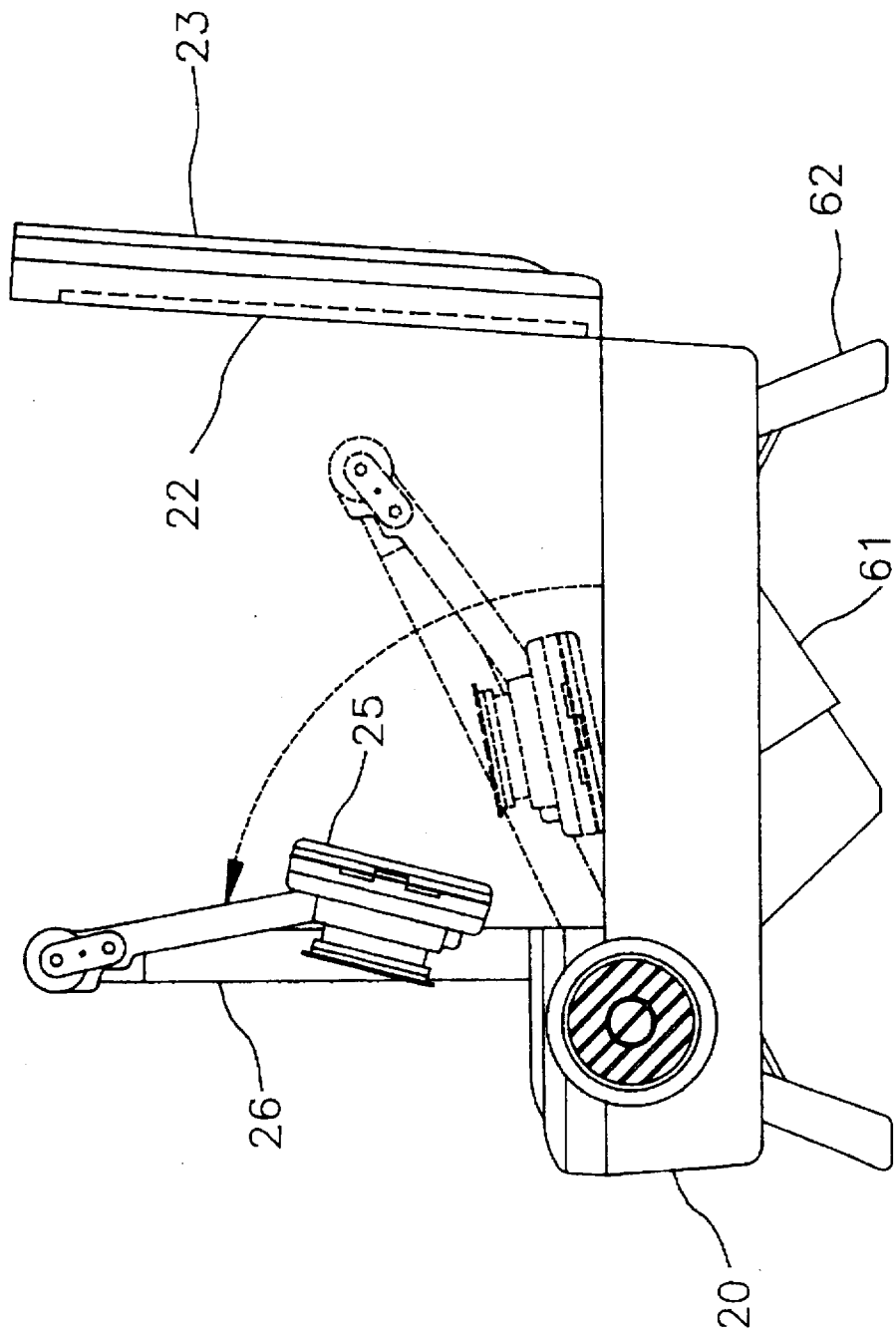
Figure 6C:
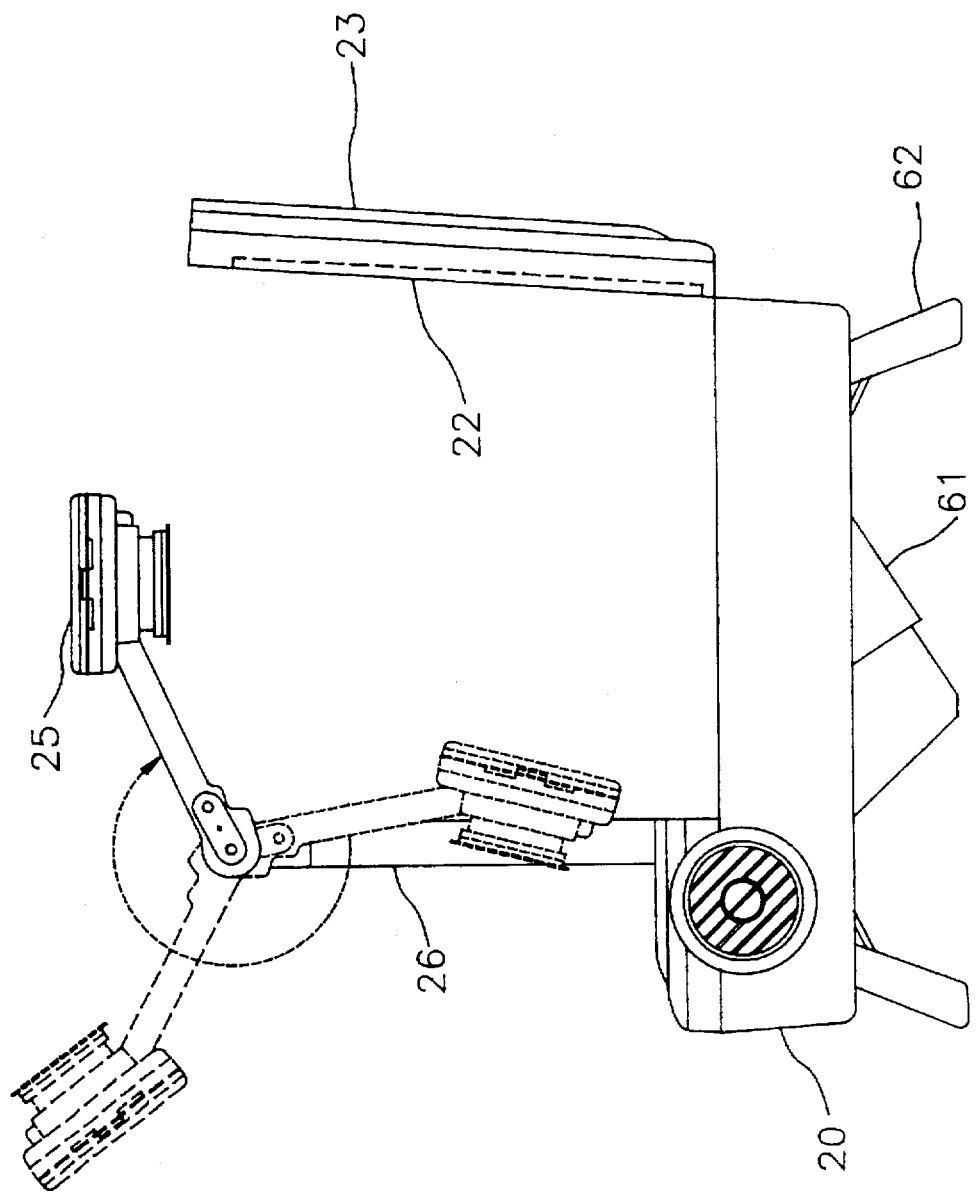
Figure 6D:
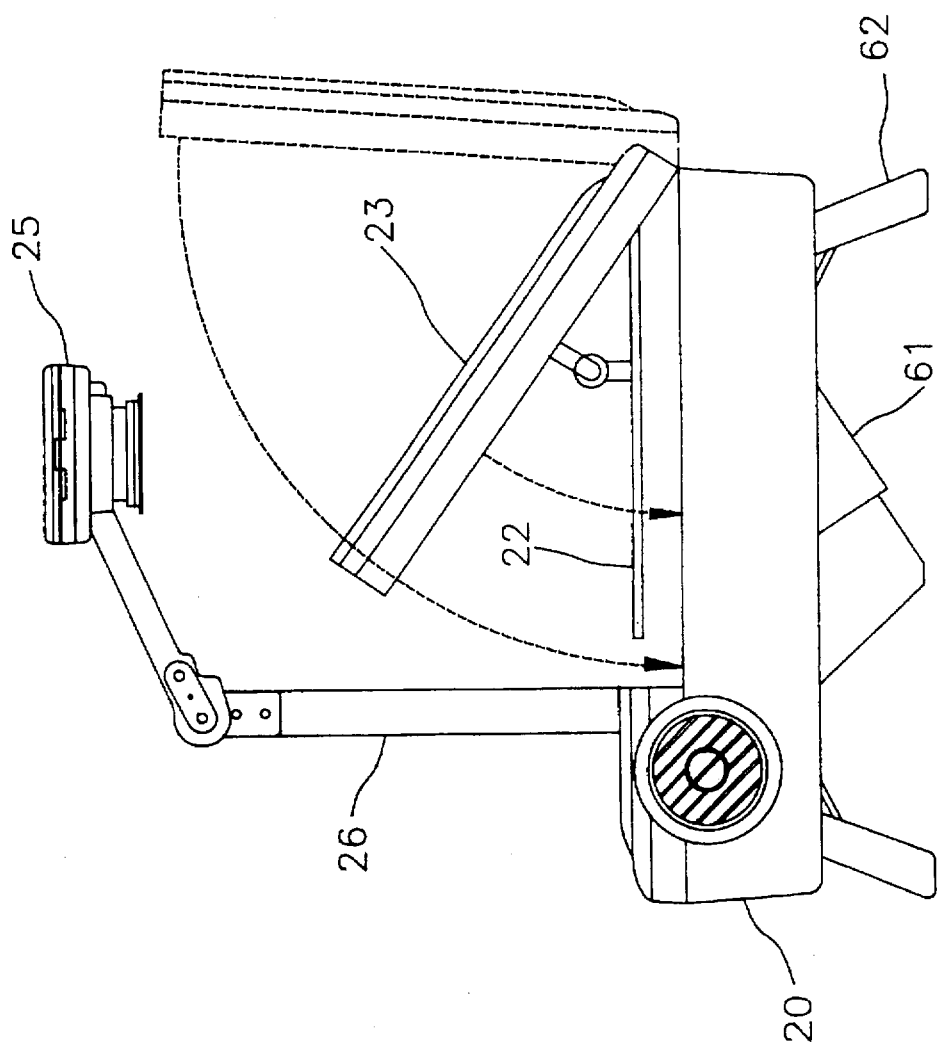

FIGS. 6A–6D indicates steps of opening the projector. As in FIG. 6A, first, put out the stands 62 and the holder 61, and lift the upper cover 23 and the first reflecting mirror 22. Then as in FIG. 6B, take out the projecting device 25 and tile foldable support 26, rotate the foldable support 26 to the position above the tipper cover 23 and fix it as in FIG. 6C, and place the upper cover 23 back as shown in FIG. 6D. According to all of the above, tile present invention makes the projector easier to carry and also make the components thereof much more secure.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projector comprising:

a casing housing therein a light source emitting therefrom a light for illuminating a projected object;

a reflector mounted in said casing for reflecting said light to said object;

an upper cover mounted on said casing and forming a top portion of said casing, and supporting thereon said projected object, and said light reflected from said reflector passing through said top portion of said casing to said projected object;

a connector securing together said reflector and said upper cover; and a projecting device mounted on a bottom portion of said casing through a support for imaging and projecting said light from said upper cover when said projecting device is being used, and said projecting device and said support positioned under said reflector when being retracted in said casing.

2. A projector as claimed in claim 1, wherein said upper cover is pivotally connected to said casing by a first pivot device.

3. A projector as claimed in claim 2, wherein said reflector is pivotally connected to said casing with a second pivot device in order that said reflector rotates with said second pivot device.

4. A projector as claimed in claim 1, wherein said connector includes a first bar member having a first end pivotally connected to said upper cover and an opposite second end, and a second bar member having a third end pivotally connected to said reflector and a fourth end pivotally connected to said second end.

5. A projector as claimed in claim 4, wherein said connector further includes a buffering device mounted between said second and fourth end.

6. A projector as claimed in claim 5, wherein said support mounted between said projecting device and said casing for supporting said projecting device on said casing.

7. A projector as claimed in claim 6, wherein said support is foldable.

8. A projector as claimed in claim 1, wherein said reflector is a reflecting mirror.

9. A projector comprising:

a casing housing therein a light source emitting therefrom a light for illuminating a projected object;

a reflector mounted in said casing for reflecting said light to said object;

an upper cover mounted on said casing and supporting thereon said projected object, said light from said reflector passing through said upper cover to said projected object;

a connector securing together said reflector and said upper cover, said connector including a first bar member having a first end pivotally connected to said upper cover and an opposite second end, and a second bar member having a third end pivotally connected to said reflector and a fourth end pivotally connected to said second end;

a projecting device mounted above said casing and said upper cover, collecting said light from said cover, imaging said light to be projected to a specific place;

a first pivot device pivotally connecting said casing to said upper cover; and a second pivot device pivotally connecting said reflector to said casing in order that said reflector rotates with said second pivot device.

10. The projector of claim 9, wherein said connector further comprises a buffering device mounted between said second and fourth end.

11. The projector of claim 10, further comprising a support mounted between said projecting device and said casing for supporting said projecting device on said casing.

12. The projector of claim 11, wherein said support is foldable and can be retracted into said casing.

13. The projector of claim 12, wherein said support and said projecting device are fixed at a bottom of said casing so that said reflector is positioned above said projecting device when said projecting device is retracted.

14. The projector of claim 13 wherein said reflector is a reflecting mirror.

* * * * *

UNITED STATES PATENT AND TRADEMARK OFFICE
CERTIFICATE OF CORRECTION

PATENT NO. : 5,722,769
DATED : Mar. 3, 1998
INVENTOR(S) : Fan

It is certified that error appears in the above-identified patent and that said Letters Patent is hereby corrected as shown below:

col. 3, line 52, after " housing " insert -- comprising --.

col. 3, line 57, after " casing " delete the comma.

col. 4, line 1, before " positioned " insert -- being --.

col. 4, line 27, after " housing " insert -- comprising --.

Signed and Sealed this

Twenty-third Day of February, 1999

Q. TODD DICKINSON

Attest:

Attesting Officer        Acting Commissioner of Patents and Trademarks

UNITED STATES PATENT AND TRADEMARK OFFICE
CERTIFICATE OF CORRECTION

PATENT NO. : 5,722,769
DATED : March 3, 1998
INVENTOR(S) : Eric Fan

It is certified that error appears in the above-identified patent and that said Letters Patent is hereby corrected as shown below:

Abstract, lines 10,11, replace "and connector" with -- and a connector --.
Column 1, line 25, change "tipper" to -- upper --.
Column 1, line 30, change "tipper" to -- upper --.
Column 2, line 59, change "mid 42" to -- and 42 --.
Column 3, line 34, change "and tile" to -- and the --.
Column 3, line 36, change "tipper" to -- upper --.
Column 4, line 2, change "in" to -- into --.

Signed and Sealed this

Eleventh Day of April, 2000

Attest:

Q. TODD DICKINSON

Attesting Officer

Director of Patents and Trademarks